(12) United States Patent
Chambers

(10) Patent No.: US 12,114,604 B2
(45) Date of Patent: Oct. 15, 2024

(54) TRACTOR MOUNTED LAWN RAKING ASSEMBLY PIVOTABLE TO A LIFTED POSITION

(71) Applicant: David Chambers, Prineville, OR (US)

(72) Inventor: David Chambers, Prineville, OR (US)

( * ) Notice: Subject to any disclaimer, the term of this patent is extended or adjusted under 35 U.S.C. 154(b) by 611 days.

(21) Appl. No.: 17/476,757

(22) Filed: Sep. 16, 2021

(65) Prior Publication Data

US 2023/0085056 A1 Mar. 16, 2023

(51) Int. Cl.
*A01D 43/02* (2006.01)
*A01D 101/00* (2006.01)

(52) U.S. Cl.
CPC .......... *A01D 43/02* (2013.01); *A01D 2101/00* (2013.01)

(58) Field of Classification Search
CPC . A01D 7/00–7/10; A01D 43/02; A01D 43/04; A01D 42/00–42/08; A01D 76/00–76/006; A01D 75/00–75/306; A01D 87/08; A01D 34/54; A01D 34/74; A01D 2034/645; A01D 2101/00; A01B 63/04; A01B 63/008; A01B 63/108; A01B 59/064; A01B 59/048; A01B 19/00–19/10; A01B 39/04; A01B 45/00; A01B 45/02; A01G 20/00–20/47
See application file for complete search history.

(56) References Cited

U.S. PATENT DOCUMENTS

| | | | | |
|---|---|---|---|---|
| 1,136,975 A | * | 4/1915 | Powers | A01B 63/04 172/502 |
| 1,752,849 A | * | 4/1930 | Hudson | A01B 63/04 172/475 |
| 2,185,409 A | * | 1/1940 | Kimmel | A01D 87/08 56/15.6 |
| 2,413,467 A | * | 12/1946 | Patterson | A01B 63/023 172/616 |
| 2,648,946 A | * | 8/1953 | Kelly | A01D 76/006 56/393 |
| 3,438,183 A | * | 4/1969 | Puretic | A01D 76/006 56/378 |
| 3,646,736 A | | 3/1972 | Hutchins | |
| 4,151,701 A | | 5/1979 | Marto | |
| 4,322,936 A | * | 4/1982 | Whitney | A01D 7/10 56/400.09 |
| 4,406,113 A | * | 9/1983 | Mullins | A01D 76/00 56/400.14 |

(Continued)

FOREIGN PATENT DOCUMENTS

EP 2263439 12/2010

*Primary Examiner* — Thomas B Will
*Assistant Examiner* — Madeline I Runco

(57) ABSTRACT

A lawn raking assembly for mounting a rake to a lawn tractor includes a rake mount that has a pair of pivot points which each pivotally engages a front end of a lawn tractor having the rake mount extending forwardly from the front end of the lawn tractor. A rake is removably attached to the rake mount for raking the lawn in front of the lawn tractor when the lawn tractor is driven. The rake has a pair of raking elements that each extends outwardly beyond a full transverse width of the lawn tractor. A linkage is coupled to the rake mount and a handle is pivotally coupled to the lawn tractor. The handle pivotally engages the linkage for urging the rake between a lifted position and a lowered position.

7 Claims, 6 Drawing Sheets

(56) References Cited

U.S. PATENT DOCUMENTS

| | | | | |
|---|---|---|---|---|
| 4,472,930 | A * | 9/1984 | Smith | A01B 45/00 |
| | | | | 56/396 |
| D298,138 | S | 10/1988 | Starr | |
| 4,945,996 | A * | 8/1990 | Codding | A01B 63/14 |
| | | | | 56/395 |
| 5,546,739 | A * | 8/1996 | Hettich | A01D 78/14 |
| | | | | 460/122 |
| 5,810,096 | A * | 9/1998 | Defrancq | A01B 63/1145 |
| | | | | 701/50 |
| 6,269,557 | B1 * | 8/2001 | Henks | E01H 5/06 |
| | | | | 74/528 |
| 6,308,505 | B1 | 10/2001 | Beckett | |
| 7,069,711 | B1 * | 7/2006 | Connell | A01B 45/00 |
| | | | | 56/16.7 |
| 7,426,795 | B2 * | 9/2008 | Raddon | E01H 5/06 |
| | | | | 37/264 |
| 8,001,753 | B2 | 8/2011 | Franco | |
| 8,220,240 | B2 | 7/2012 | Tielburger | |
| 9,545,050 | B2 * | 1/2017 | Fichera | A01D 34/001 |
| 2006/0236670 | A1 | 10/2006 | Glasford | |

\* cited by examiner

TRACTOR MOUNTED LAWN RAKING ASSEMBLY PIVOTABLE TO A LIFTED POSITION

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to raking devices and more particularly pertains to a new raking device for mounting a rake to a lawn tractor. The device includes a rake mount that pivotally mounts to a front end of a lawn tractor and a rake that is attachable to the rake mount. In this way the rake can rake a lawn in front of the lawn tractor when the lawn tractor is driven. The rake includes a pair of racking elements that each extends outwardly beyond a full transverse width of the lawn tractor. The device includes a handle and linkage which are coupled to the rake mount for lifting and lowering the rake.

(2) Description of Related Art Including Information Disclosed Under 37 CFR 1.97 and 1.98

The prior art relates to raking devices including a variety of a rake devices that are mountable to a front of a lawn tractor and which each includes a single raking element. The prior art discloses a rake device that is mountable to a front end of a lawn tractor and which includes a pair of raking elements that are positioned side by side. In no instance does the prior art disclose a rake device that is mountable to a front of a lawn tractor and which includes a pair of raking elements, oriented parallel to each other, and which extend beyond a full transverse width of the lawn tractor.

BRIEF SUMMARY OF THE INVENTION

An embodiment of the disclosure meets the needs presented above by generally comprising a rake mount that has a pair of pivot points which each pivotally engages a front end of a lawn tractor having the rake mount extending forwardly from the front end of the lawn tractor. A rake is removably attached to the rake mount for raking the lawn in front of the lawn tractor when the lawn tractor is driven. The rake has a pair of raking elements that each extends outwardly beyond a full transverse width of the lawn tractor. A linkage is coupled to the rake mount and a handle is pivotally coupled to the lawn tractor. The handle pivotally engages the linkage for urging the rake between a lifted position and a lowered position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
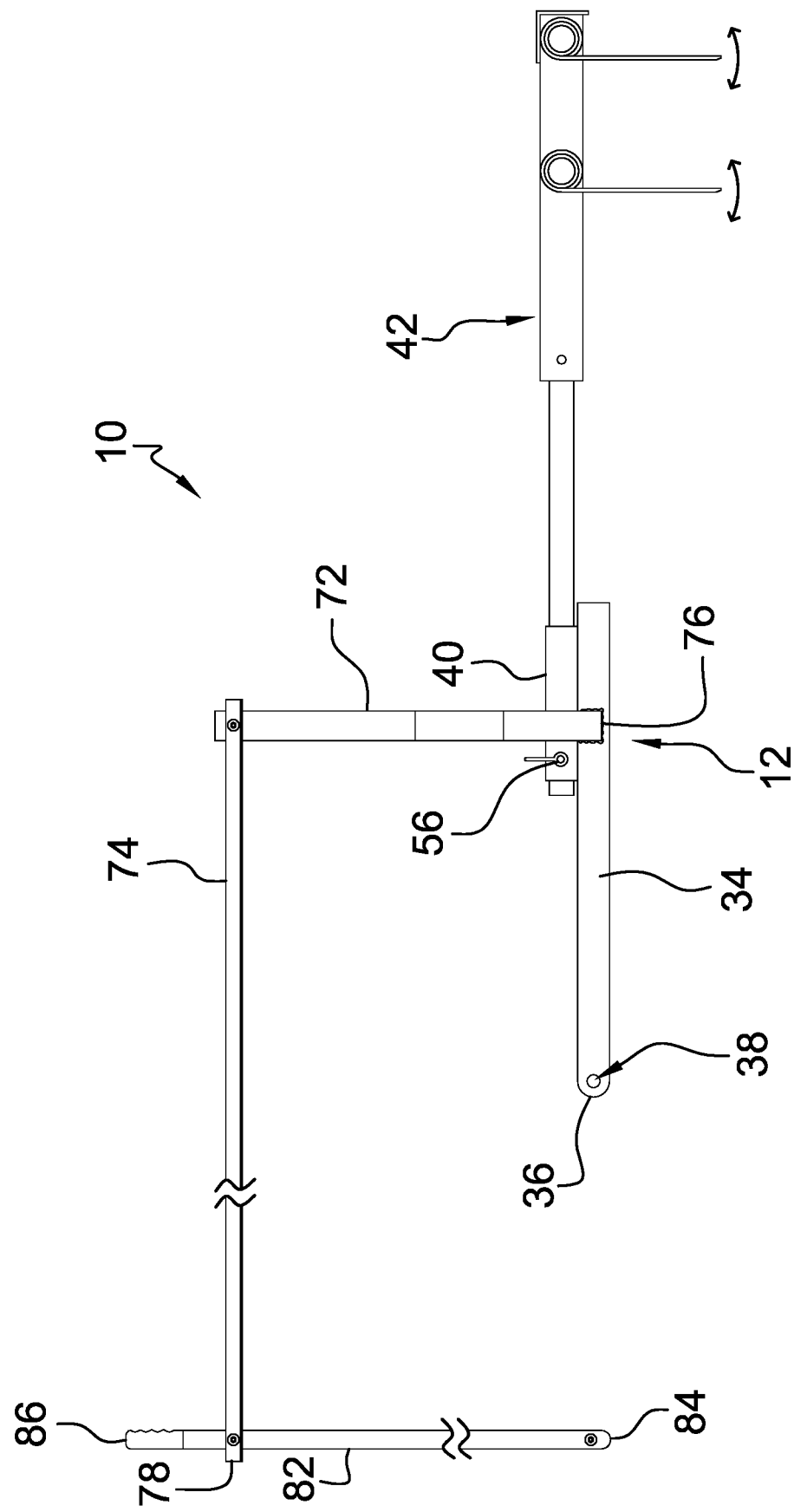
FIG. 1 is a right side view of a lawn raking assembly according to an embodiment of the disclosure.
Figure 2:
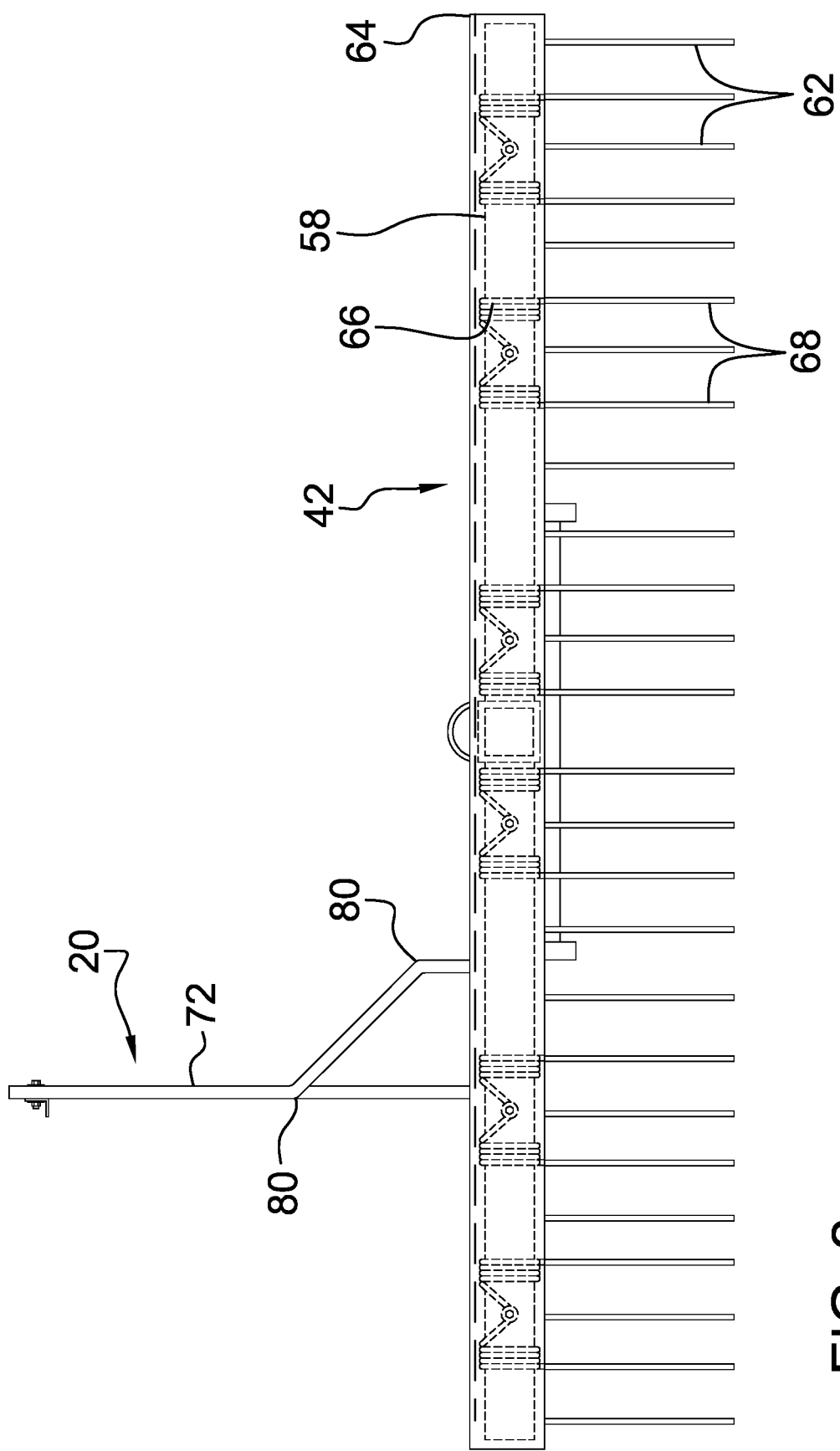
FIG. 2 is a front view of an embodiment of the disclosure.
Figure 3:
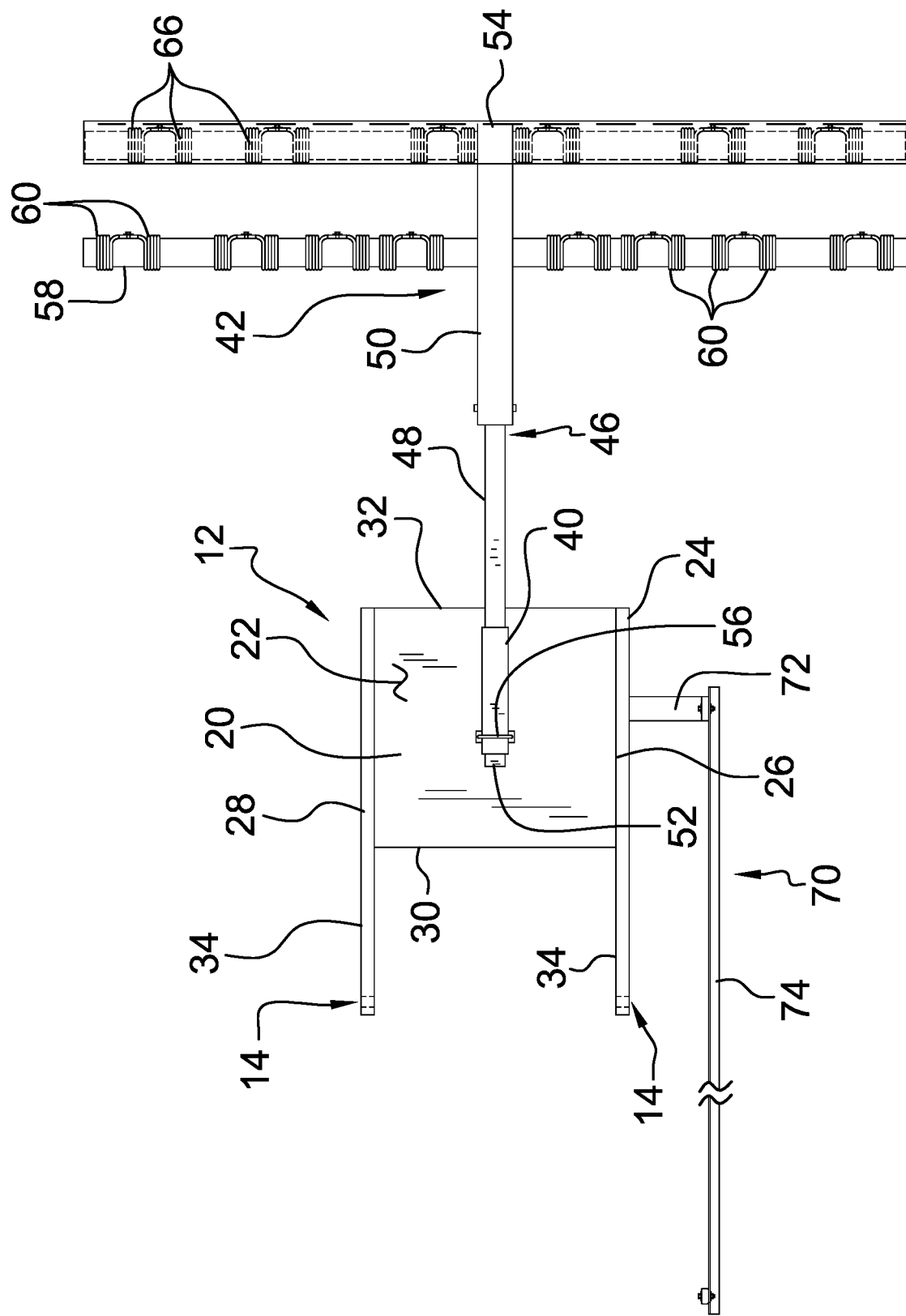
FIG. 3 is a top view of an embodiment of the disclosure.
Figure 4:
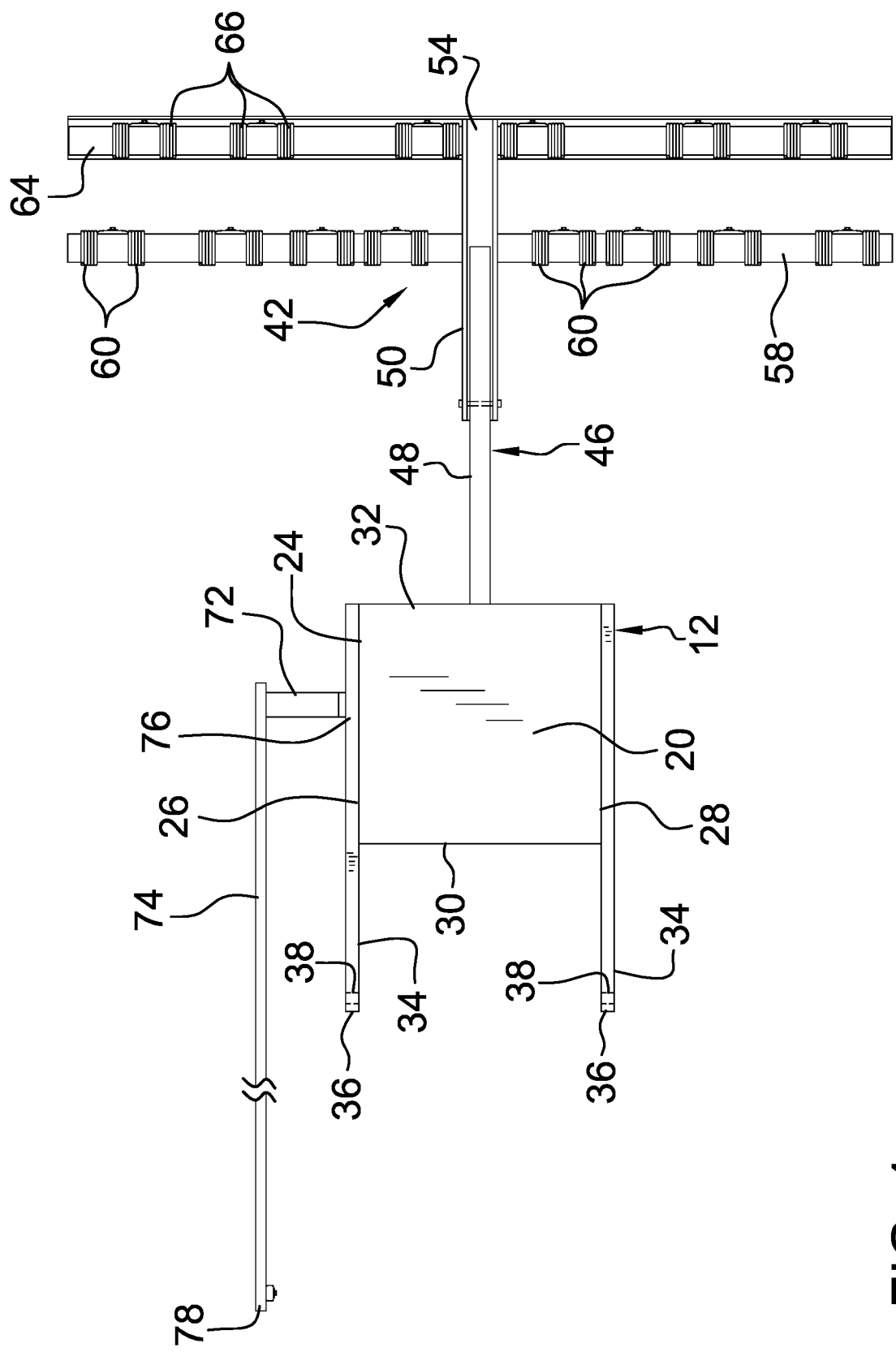
FIG. 4 is a bottom view of an embodiment of the disclosure.
Figure 5:
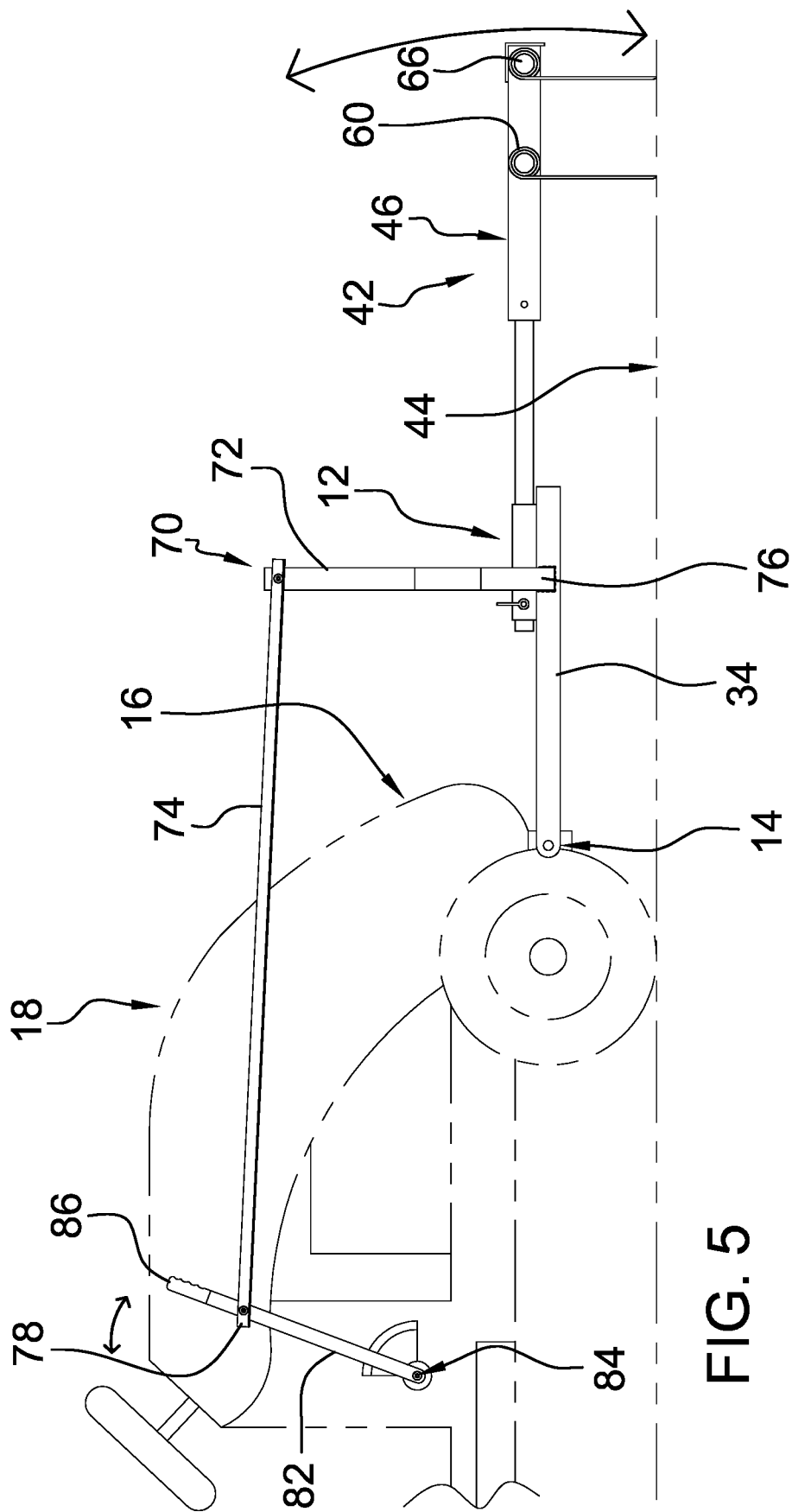
FIG. 5 is a perspective in-use view of an embodiment of the disclosure showing a rake being positioned in a lowered position.
Figure 6:
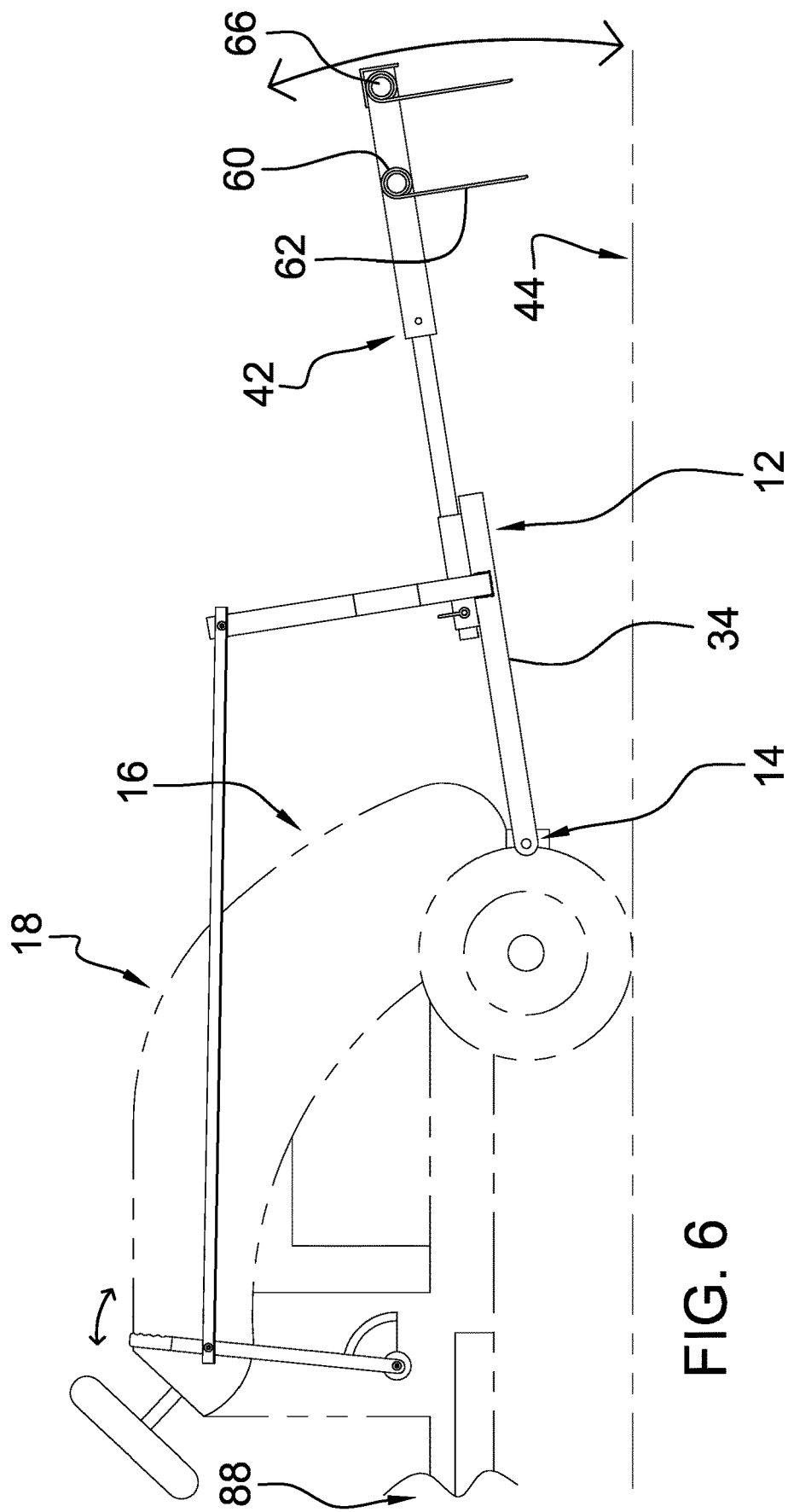
FIG. 6 is a perspective in-use view of an embodiment of the disclosure showing a rake being positioned in a lifted position.

With reference now to the drawings, and in particular to FIGS. 1 through 6 thereof, a new raking device embodying the principles and concepts of an embodiment of the disclosure and generally designated by the reference numeral 10 will be described.

As best illustrated in FIGS. 1 through 6, the lawn raking assembly 10 generally comprises a rake mount 12 that has a pair of pivot points 14. Each of the pivot points 14 pivotally engages a front end 16 of a lawn tractor 18 having the rake mount 12 extending forwardly from the front end 16 of the lawn tractor 18. The lawn tractor 18 may be a riding lawn 44 mower of any conventional design. The rake mount 12 comprises a panel 20 that has a first surface 22 and a perimeter edge 24, and the perimeter edge 24 has a first lateral side 26, a second lateral side 28, a front side 30 and a back side 32.

The rake mount 12 includes a pair of support members 34 that is each coupled to the panel 20, and each of the support members 34 is positioned on a respective one of the first lateral side 26 and the second lateral side 28 of the perimeter edge 24 of the panel 20. Each of the support members 34 extends beyond the back side 32 of the perimeter edge 24 and each of the support members 34 has a distal end 36 with respect to the back side 32. Additionally, each of the support members 34 has a mounting hole 38 extending therethrough and the mounting hole 38 in each of the support members 34 is positioned adjacent to the distal end 36 of a respective support member. Moreover, the mounting hole 38 in each of the support members 34 defines a respective one of the pivot points 14. A pair of bolts, or other type of fastener, may extend through a respective mounting hole 38 and engage the lawn tractor 18 for attaching the rake mount 12 to the lawn tractor 18.

The rake mount 12 includes a receiver 40 that is coupled to the first surface 22 of the panel 20. The receiver 40 is oriented to extend along a line that extends between the front side 30 and the back side 32 of the perimeter edge 24. The receiver 40 is positioned adjacent to the front side 30 and the receiver 40 is centrally positioned between the first lateral side 26 and the second lateral side 28.

A rake 42 is provided and the rake 42 is removably attached to the rake mount 12 such that the rake 42 extends forwardly from the front end 16 of the lawn tractor 18. In this way the rake 42 can rake the lawn 44 in front of the lawn tractor 18 when the lawn tractor 18 is driven. The rake 42 is positionable in a lifted position having the rake 42 being spaced upwardly from the lawn 44. Conversely, the rake 42 is positionable in a lowered position having the rake 42 engaging the lawn 44.

The rake 42 comprises a central member 46 which itself includes a first section 48 that slidably engages a second section 50 such that the central member 46 has a telescopically adjustable length. The central member 46 has a first end 52 and a second end 54; the first end 52 is associated with the first section 48 and the second end 54 is associated with the second section 50. Additionally, the first section 48 is insertable into the receiver 40 on the panel 20 having the central member 46 extending forwardly from the panel 20. A pin 56 may be extendable through the receiver 40 and engage the first section 48 for retaining the rake 42 on the rake mount 12.

The rake 42 includes a first cross member 58 that is coupled to and is oriented transverse with the second section 50 of the central member 46. Additionally, the first cross member 58 is centrally positioned on the second section 50. A plurality of first tines 60 is each coiled around the first cross member 58 to define a pair of arms 62 of each of the first tines 60. Moreover, each of the arms 62 extends downwardly from the first cross member 58 to rake the lawn 44 when the rake 42 is in the lowered position. The first tines 60 are spaced apart from each other and are distributed along a full length of the first cross member 58. The coiling of the first tines 60 around the first cross member 58 facilitates each of the arms 62 to be spring loaded.

The rake 42 includes a second cross member 64 that is coupled to and is oriented transverse with the second section 50 of the central member 46. The second cross member 64 is positioned adjacent to the second end 54 of the second section 50. A plurality of second tines 66 is each coiled around the second cross member 64 to define a pair of arms 68 of each of the second tines 66. Additionally, each of the arms 68 of the second tines 66 extends downwardly from the second cross member 64 to rake the lawn 44 when the rake 42 is in the lowered position. The second tines 66 are spaced apart from each other and are distributed along a full length of the second cross member 64.

A linkage 70 is coupled to the rake mount 12 and the linkage 70 includes a primary section 72 that is pivotally coupled to a secondary section 74. The linkage 70 has a primary end 76 that is associated with the primary section 72, and the linkage 70 has a secondary end 78 that is associated with the secondary section 74. The primary end 76 is coupled to a respective one of the support members 34 of the rake mount 12. Moreover, the primary section 72 is oriented perpendicular to the respective support member 34 having the primary section 72 being vertically oriented when the rake mount 12 is mounted to the front end 16 of the lawn tractor 18. As is most clearly shown in FIG. 2, the primary section 72 has a sequence of bends 80 to facilitate the primary section 72 to angle outwardly away from the panel 20 such that the secondary section 74 is displaced from being positioned over the panel 20.

A handle 82 is provided and the handle 82 is pivotally coupled to the lawn tractor 18 such that the handle 82 can be manipulated by a driver. The handle 82 pivotally engages the linkage 70 for urging the rake 42 between the lifted position and the lowered position. The handle 82 has a lower end 84 and an upper end 86, and the lower end 84 is pivotally coupled to the lawn tractor 18. The secondary end 78 of the linkage 70 pivotally engages the handle 82 at a point that is positioned adjacent to the upper end 86. In this way the secondary section 74 of the linkage 70 is horizontally oriented when the rake mount 12 is mounted to the front end 16 of the lawn tractor 18. The handle 82 can be pivoted toward a rear end 88 of the lawn tractor 18 for urging the rake 42 into the lifted position. Conversely, the handle 82 can be pivoted toward the front end 16 of the lawn tractor 18 for urging the rake 42 into the lowered position.

In use, each of the support members 34 is attached to the lawn tractor 18 and the handle 82 is attached to the lawn tractor 18. The first section 48 of the central member 46 is inserted into the receiver 40 for attaching the rake 42 to the rake mount 12. In this way the first tines 60 and the second tines 66 can rake the lawn 44 in front of the lawn tractor 18 when the lawn tractor 18 is driven. The handle 82 can be manipulated to position the rake 42 between the lifted position and the lowered position. The first section 48 of the central member 46 is removable from the receiver 40 at any time to facilitate the lawn tractor 18 to be driven without the rake 42.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lawn raking assembly being mountable to a front of a lawn tractor for raking a lawn, said assembly comprising:
    a rake mount having a pair of pivot points, each of said pivot points pivotally engaging the front end of the lawn tractor having said rake mount extending forwardly from said front end of said lawn tractor;
    a rake being removably attached to said rake mount having said rake extending forwardly from said front end of said lawn tractor wherein said rake is configured to rake the lawn in front of said lawn tractor, said rake having a pair of raking elements being oriented parallel to each other, each of said raking elements being elongated to extend outwardly beyond a full transverse width of said lawn tractor, said raking elements being oriented parallel to each other, said rake being positionable in a lifted position having said each of said raking elements being spaced upwardly from the lawn, said rake being positionable in a lowered position having each of said raking elements engaging the lawn;
    a linkage being coupled to said rake mount;
    a handle being pivotally coupled to said lawn tractor wherein said handle is configured to be manipulated by a driver, said handle pivotally engaging said linkage for urging said rake between said lifted position and said lowered position; and
    wherein said rake mount comprises:
        a panel having a first surface and a perimeter edge, said perimeter edge having a first lateral side, a second lateral side, a front side and a back side;
        a pair of support members, each of said support members being coupled to said panel, each of said support members being positioned on a respective one of said first lateral side and said second lateral side of said perimeter edge of said panel, each of said support members extending beyond said back side of said perimeter edge, each of said support members having a distal end with respect to said back side, each of said support members having a mounting hole extending therethrough, said mounting hole in each of said support members being positioned adjacent to said distal end of a respective support member, said mounting hole in each of said support members defining a respective one of said pivot points; and
        a receiver being coupled to said first surface of said panel, said receiver being oriented to extend along a line extending between said front side and said back side of said perimeter edge, said receiver being positioned adjacent to said front side, said receiver being centrally positioned between said first lateral side and said second lateral side.

2. The assembly according to claim 1, wherein said rake comprises:
    a central member comprising first section slidably engaging a second section such that said central member has a telescopically adjustable length, said central member having a first end and a second end, said first end being associated with said first section, said second end being associated with said second section, said first section being insertable into said receiver on said panel having said central member extending forwardly from said panel;
    a first cross member being coupled to and being oriented transverse with said second section of said central member, said first cross member being centrally positioned on said second section; and
    a second cross member being coupled to and being oriented transverse with said second section of said central member, said second cross member being positioned adjacent to said second end of said second section.

3. The assembly according to claim 2, wherein said rake comprises:
    a plurality of first tines, each of said first tines being coiled around said first cross member to define a pair of arms of each of said first tines, each of said arms extending downwardly from said first cross member wherein each of said arms of said first tines is configured to rake the lawn when said rake is in said lowered position, said first tines being spaced apart from each other and being distributed along a full length of said first cross member; and
    a plurality of second tines, each of said second tines being coiled around said second cross member to define a pair of arms of each of said second tines, each of said arms of said second tines extending downwardly from said second cross member wherein each of said arms of said second tines is configured to rake the lawn when said rake is in said lowered position, said second tines being spaced apart from each other and being distributed along a full length of said second cross member.

4. The assembly according to claim 1, wherein said linkage includes a primary section being pivotally coupled to a secondary section, said linkage having a primary end being associated with said primary section, said linkage having a secondary end being associated with said secondary section, said primary end being coupled to a respective one of said support members of said rake mount, said primary section being oriented perpendicular to said respective support member having said primary section being vertically oriented when said rake mount is mounted to said front end of said lawn tractor.

5. The assembly according to claim 4, wherein said handle has a lower end and an upper end, said lower end being pivotally coupled to said lawn tractor, said secondary end of said linkage pivotally engaging said handle at a point being positioned adjacent to said upper end having said secondary section of said linkage being horizontally oriented when said rake mount is mounted to said front end of said lawn tractor, said handle being pivotable toward a rear end of said lawn tractor for urging said rake into said lifted position, said handle being pivotable toward said front end of said lawn tractor for urging said rake into said lowered position.

6. A lawn raking assembly being mountable to a front of a lawn tractor for raking a lawn, said assembly comprising:
    a rake mount having a pair of pivot points, each of said pivot points pivotally engaging the front end of the lawn tractor having said rake mount extending forwardly from said front end of said lawn tractor, said rake mount comprising:
        a panel having a first surface and a perimeter edge, said perimeter edge having a first lateral side, a second lateral side, a front side and a back side;
        a pair of support members, each of said support members being coupled to said panel, each of said support members being positioned on a respective one of said first lateral side and said second lateral side of said perimeter edge of said panel, each of said support members extending beyond said back side of said perimeter edge, each of said support members having a distal end with respect to said back side, each of said support members having a mounting hole extending therethrough, said mounting hole in each of said support members being positioned adjacent to said distal end of a respective support member, said mounting hole in each of said support members defining a respective one of said pivot points; and
a receiver being coupled to said first surface of said panel, said receiver being oriented to extend along a line extending between said front side and said back side of said perimeter edge, said receiver being positioned adjacent to said front side, said receiver being centrally positioned between said first lateral side and said second lateral side;
a rake being removably attached to said rake mount having said rake extending forwardly from said front end of said lawn tractor wherein said rake is configured to rake the lawn in front of said lawn tractor, said rake being positionable in a lifted position having said rake being spaced upwardly from the lawn, said rake being positionable in a lowered position having said rake engaging the lawn, said rake comprising:
a central member comprising first section slidably engaging a second section such that said central member has a telescopically adjustable length, said central member having a first end and a second end, said first end being associated with said first section, said second end being associated with said second section, said first section being insertable into said receiver on said panel having said central member extending forwardly from said panel;
a first cross member being coupled to and being oriented transverse with said second section of said central member, said first cross member being centrally positioned on said second section;
a plurality of first tines, each of said first tines being coiled around said first cross member to define a pair of arms of each of said first tines, each of said arms extending downwardly from said first cross member wherein each of said arms of said first tines is configured to rake the lawn when said rake is in said lowered position, said first tines being spaced apart from each other and being distributed along a full length of said first cross member;
a second cross member being coupled to and being oriented transverse with said second section of said central member, said second cross member being positioned adjacent to said second end of said second section; and
a plurality of second tines, each of said second tines being coiled around said second cross member to define a pair of arms of each of said second tines, each of said arms of said second tines extending downwardly from said second cross member wherein each of said arms of said second tines is configured to rake the lawn when said rake is in said lowered position, said second tines being spaced apart from each other and being distributed along a full length of said second cross member;
a linkage being coupled to said rake mount, said linkage including a primary section being pivotally coupled to a secondary section, said linkage having a primary end being associated with said primary section, said linkage having a secondary end being associated with said secondary section, said primary end being coupled to a respective one of said support members of said rake mount, said primary section being oriented perpendicular to said respective support member having said primary section being vertically oriented when said rake mount is mounted to said front end of said lawn tractor; and
a handle being pivotally coupled to said lawn tractor wherein said handle is configured to be manipulated by a driver, said handle pivotally engaging said linkage for urging said rake between said lifted position and said lowered position, said handle having a lower end and an upper end, said lower end being pivotally coupled to said lawn tractor, said secondary end of said linkage pivotally engaging said handle at a point being positioned adjacent to said upper end having said secondary section of said linkage being horizontally oriented when said rake mount is mounted to said front end of said lawn tractor, said handle being pivotable toward a rear end of said lawn tractor for urging said rake into said lifted position, said handle being pivotable toward said front end of said lawn tractor for urging said rake into said lowered position.

7. A lawn raking system comprising:
a lawn tractor having a front end;
a rake mount having a pair of pivot points, each of said pivot points pivotally engaging said front end of said lawn tractor having said rake mount extending forwardly from said front end of said lawn tractor, said rake mount comprising:
a panel having a first surface and a perimeter edge, said perimeter edge having a first lateral side, a second lateral side, a front side and a back side;
a pair of support members, each of said support members being coupled to said panel, each of said support members being positioned on a respective one of said first lateral side and said second lateral side of said perimeter edge of said panel, each of said support members extending beyond said back side of said perimeter edge, each of said support members having a distal end with respect to said back side, each of said support members having a mounting hole extending therethrough, said mounting hole in each of said support members being positioned adjacent to said distal end of a respective support member, said mounting hole in each of said support members defining a respective one of said pivot points; and
a receiver being coupled to said first surface of said panel, said receiver being oriented to extend along a line extending between said front side and said back side of said perimeter edge, said receiver being positioned adjacent to said front side, said receiver being centrally positioned between said first lateral side and said second lateral side;
a rake being removably attached to said rake mount having said rake extending forwardly from said front end of said lawn tractor wherein said rake is configured to rake the lawn in front of said lawn tractor, said rake being positionable in a lifted position having said rake being spaced upwardly from the lawn, said rake being positionable in a lowered position having said rake engaging the lawn, said rake comprising:
a central member comprising first section slidably engaging a second section such that said central member has a telescopically adjustable length, said central member having a first end and a second end, said first end being associated with said first section, said second end being associated with said second section, said first section being insertable into said receiver on said panel having said central member extending forwardly from said panel;

a first cross member being coupled to and being oriented transverse with said second section of said central member, said first cross member being centrally positioned on said second section;

a plurality of first tines, each of said first tines being coiled around said first cross member to define a pair of arms of each of said first tines, each of said arms extending downwardly from said first cross member wherein each of said arms of said first tines is configured to rake the lawn when said rake is in said lowered position, said first tines being spaced apart from each other and being distributed along a full length of said first cross member;

a second cross member being coupled to and being oriented transverse with said second section of said central member, said second cross member being positioned adjacent to said second end of said second section; and a plurality of second tines, each of said second tines being coiled around said second cross member to define a pair of arms of each of said second tines, each of said arms of said second tines extending downwardly from said second cross member wherein each of said arms of said second tines is configured to rake the lawn when said rake is in said lowered position, said second tines being spaced apart from each other and being distributed along a full length of said second cross member;

a linkage being coupled to said rake mount, said linkage including a primary section being pivotally coupled to a secondary section, said linkage having a primary end being associated with said primary section, said linkage having a secondary end being associated with said secondary section, said primary end being coupled to a respective one of said support members of said rake mount, said primary section being oriented perpendicular to said respective support member having said primary section being vertically oriented when said rake mount is mounted to said front end of said lawn tractor; and a handle being pivotally coupled to said lawn tractor wherein said handle is configured to be manipulated by a driver, said handle pivotally engaging said linkage for urging said rake between said lifted position and said lowered position, said handle having a lower end and an upper end, said lower end being pivotally coupled to said lawn tractor, said secondary end of said linkage pivotally engaging said handle at a point being positioned adjacent to said upper end having said secondary section of said linkage being horizontally oriented when said rake mount is mounted to said front end of said lawn tractor, said handle being pivotable toward a rear end of said lawn tractor for urging said rake into said lifted position, said handle being pivotable toward said front end of said lawn tractor for urging said rake into said lowered position.

* * * * *